United States Patent
Sato

(10) Patent No.: US 10,864,869 B2
(45) Date of Patent: Dec. 15, 2020

(54) VEHICLE FRAME STRUCTURE

(71) Applicant: TOYOTA JIDOSHA KABUSHIKI KAISHA, Aichi-ken (JP)

(72) Inventor: Masafumi Sato, Aichi-ken (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 79 days.

(21) Appl. No.: 16/262,923

(22) Filed: Jan. 31, 2019

(65) Prior Publication Data

US 2019/0291668 A1 Sep. 26, 2019

(30) Foreign Application Priority Data

Mar. 22, 2018 (JP) .................................. 2018-054304

(51) Int. Cl.
| | |
|---|---|
| B60R 19/12 | (2006.01) |
| B60R 19/34 | (2006.01) |
| B60R 19/52 | (2006.01) |
| B60R 19/18 | (2006.01) |

(52) U.S. Cl.
CPC .............. *B60R 19/12* (2013.01); *B60R 19/18* (2013.01); *B60R 19/34* (2013.01); *B60R 19/52* (2013.01)

(58) Field of Classification Search
CPC ......... B60R 19/12; B60R 19/18; B60R 19/52; B60R 19/34

USPC ......................................................... 293/102
See application file for complete search history.

(56) References Cited

U.S. PATENT DOCUMENTS

| | | | | |
|---|---|---|---|---|
| 2013/0043692 | A1* | 2/2013 | Chiba ................. | B60R 19/18 293/132 |
| 2013/0119680 | A1* | 5/2013 | Kosaka ................. | B60R 19/04 293/102 |

FOREIGN PATENT DOCUMENTS

| | | |
|---|---|---|
| JP | 2009-173200 A | 8/2009 |
| JP | 2012-96752 A | 5/2012 |
| JP | 2015-157606 A | 9/2015 |

* cited by examiner

*Primary Examiner* — Joseph D. Pape
*Assistant Examiner* — Dana D Ivey
(74) *Attorney, Agent, or Firm* — Hauptman Ham, LLP

(57) ABSTRACT

A vehicle frame structure that includes a bumper reinforcement that includes a middle constituent portion that is positioned further toward a vehicle lower side than an upper wall portion configuring an upper surface of a upper constituent member, that is positioned further toward the vehicle lower side than a lower wall portion configuring a lower surface of a lower constituent member, and that is provided with load transmission inhibitors that inhibit load transmission from the middle constituent portion to a shock absorbing components in a case in which a load has been input to the bumper reinforcement from an opposite side from a shock absorbing components side.

11 Claims, 6 Drawing Sheets

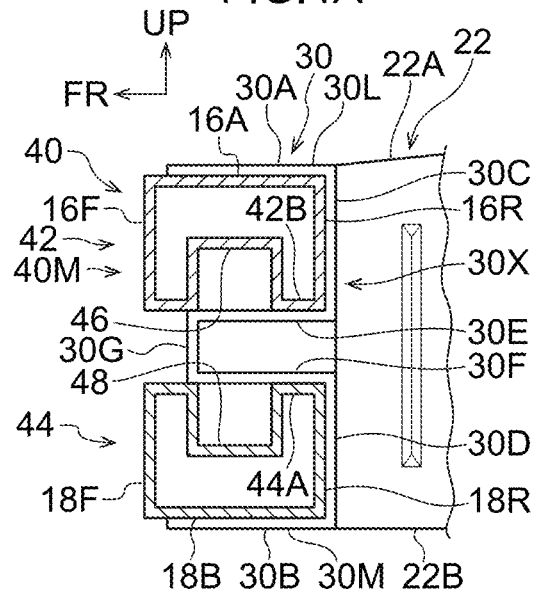
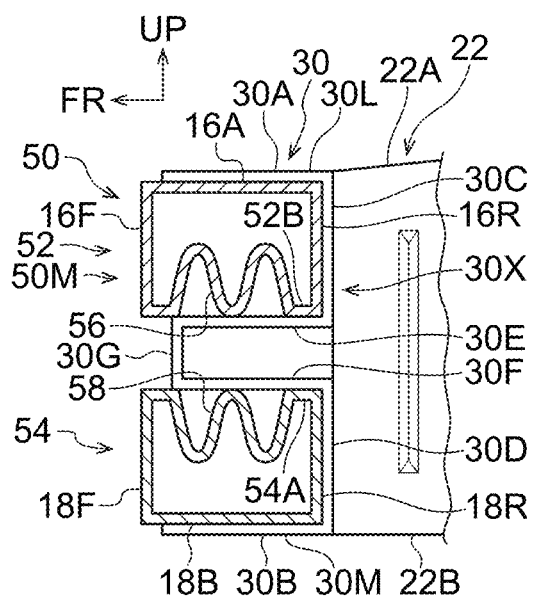

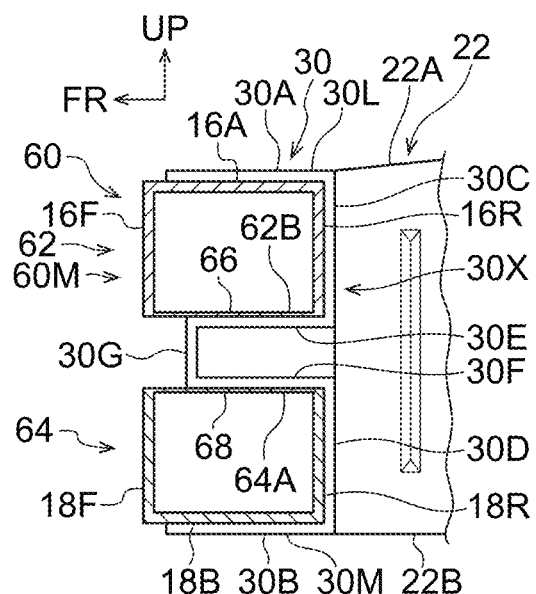
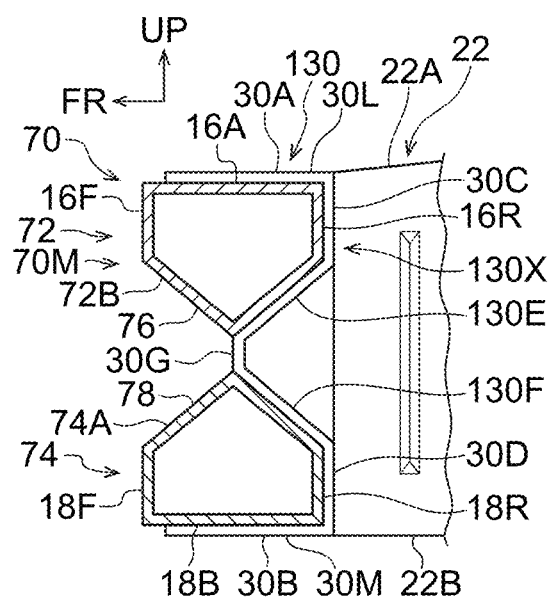

VEHICLE FRAME STRUCTURE

CROSS-REFERENCE TO RELATED APPLICATION

This application is based on and claims priority under 35 USC 119 from Japanese Patent Application No. 2018-054304 filed on Mar. 22, 2018, which is incorporated by reference herein.

BACKGROUND

Technical Field

The present disclosure relates to a vehicle frame structure.

Related Art

A vehicle frame structure is known where a bumper reinforcement that extends along the vehicle width direction is disposed on a vehicle front and rear direction end portion of a vehicle body (see Japanese Patent Application Laid-open (JP-A) No. 2015-157606 and JP-A No. 2009-173200). For example, JP-A No. 2015-157606 discloses a configuration where a front bumper reinforcement is configured by an upper constituent member and a lower constituent member and where these constituent members are disposed an interval apart from each other in the vehicle up and down direction. To briefly describe this configuration, the upper constituent member and the lower constituent member each have a cross-sectional rectangular shape with a constant plate thickness, and rear wall surfaces on both vehicle width direction end portion sides of the upper constituent member and the lower constituent member are joined to front end portions of front side members. In this configuration, air can pass between the upper constituent member and the lower constituent member.

In this connection, according to the above technology, at the time of a frontal impact to the vehicle the impact load is transmitted from a lower wall portion of the upper constituent member and an upper wall portion of the lower constituent member to vehicle up and down direction middle portions of the front side members. For this reason, in a case where shock absorbing components with a closed cross-sectional structure are provided on the front end portion sides of the front side members, it becomes difficult for the shock absorbing components to be deformed in the desired mode of deformation. Thus, there is room for improvement with respect to the shock absorption amount at the time of a frontal impact to the vehicle.

SUMMARY

An aspect of the present disclosure is a vehicle frame structure that includes: a bumper reinforcement that is disposed at a vehicle front and rear direction end portion of a vehicle body and that extends along a vehicle width direction; and shock absorbing components that extend along a vehicle front and rear direction from vehicle width direction end portion sides of the bumper reinforcement toward a vehicle front and rear direction central portion side of the vehicle body, that are configured to have a closed cross-sectional structure, and that become compressively deformed by input of a load equal to or greater than a predetermined value from the bumper reinforcement, wherein the bumper reinforcement includes: an upper constituent member that extends along the vehicle width direction, that is disposed in such a way that positions of its vehicle width direction end portion sides correspond to upper portion sides of the shock absorbing components, and that is formed in a hollow shape, a lower constituent member that extends along the vehicle width direction, that is disposed in such a way that positions of its vehicle width direction end portion sides correspond to lower portion sides of the shock absorbing components, that is disposed at an interval apart from, and on a vehicle lower side of, the upper constituent member, and that is formed in a hollow shape, and a middle constituent portion that is positioned further toward the vehicle lower side than an upper wall portion configuring an upper surface of the upper constituent member, that is positioned further toward the vehicle lower side than a lower wall portion configuring a lower surface of the lower constituent member, and that is provided with load transmission inhibitors that inhibit load transmission from the middle constituent portion to the shock absorbing components in a case in which a load has been input to the bumper reinforcement from an opposite side from a shock absorbing components side.

BRIEF DESCRIPTION OF THE DRAWINGS

FIG. 4A is a longitudinal sectional view showing a first example modification:

FIG. 4B is a longitudinal sectional view showing a second example modification;

FIG. 4C is a longitudinal sectional view showing a third example modification;

FIG. 4D is a longitudinal sectional view showing a fourth example modification:

DETAILED DESCRIPTION

A vehicle frame structure pertaining to an embodiment of the disclosure will be described using FIG. 1 to FIG. 3B. It will be noted that arrow FR appropriately shown in these drawings indicates a vehicle forward direction, arrow UP indicates a vehicle upward direction, and arrow W indicates a vehicle width direction. Furthermore, FIG. 3A and FIG. 3B show part of a right front portion of the vehicle, and the vehicle frame structure pertaining to the disclosure has a bilaterally symmetrical structure.

(Configuration of Embodiment)

Figure 1:
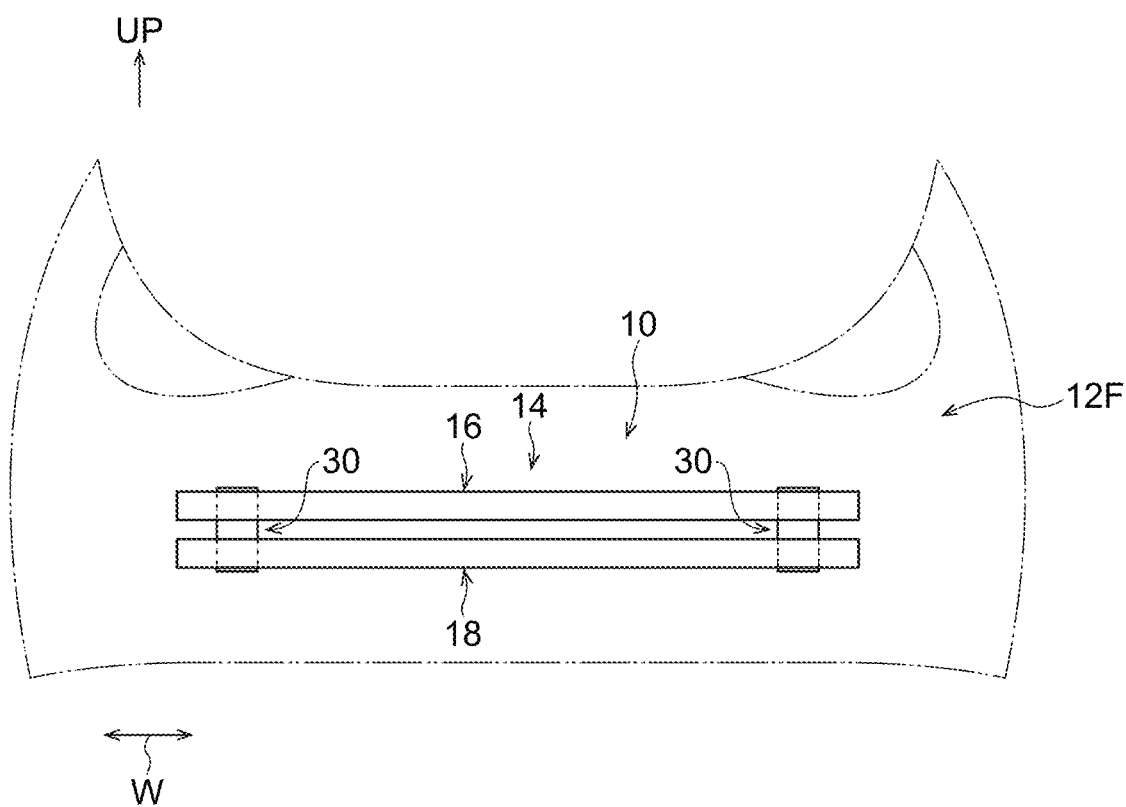
FIG. 1 is a simplified front view showing a vehicle frame structure pertaining to an embodiment of the disclosure.
Figure 2:
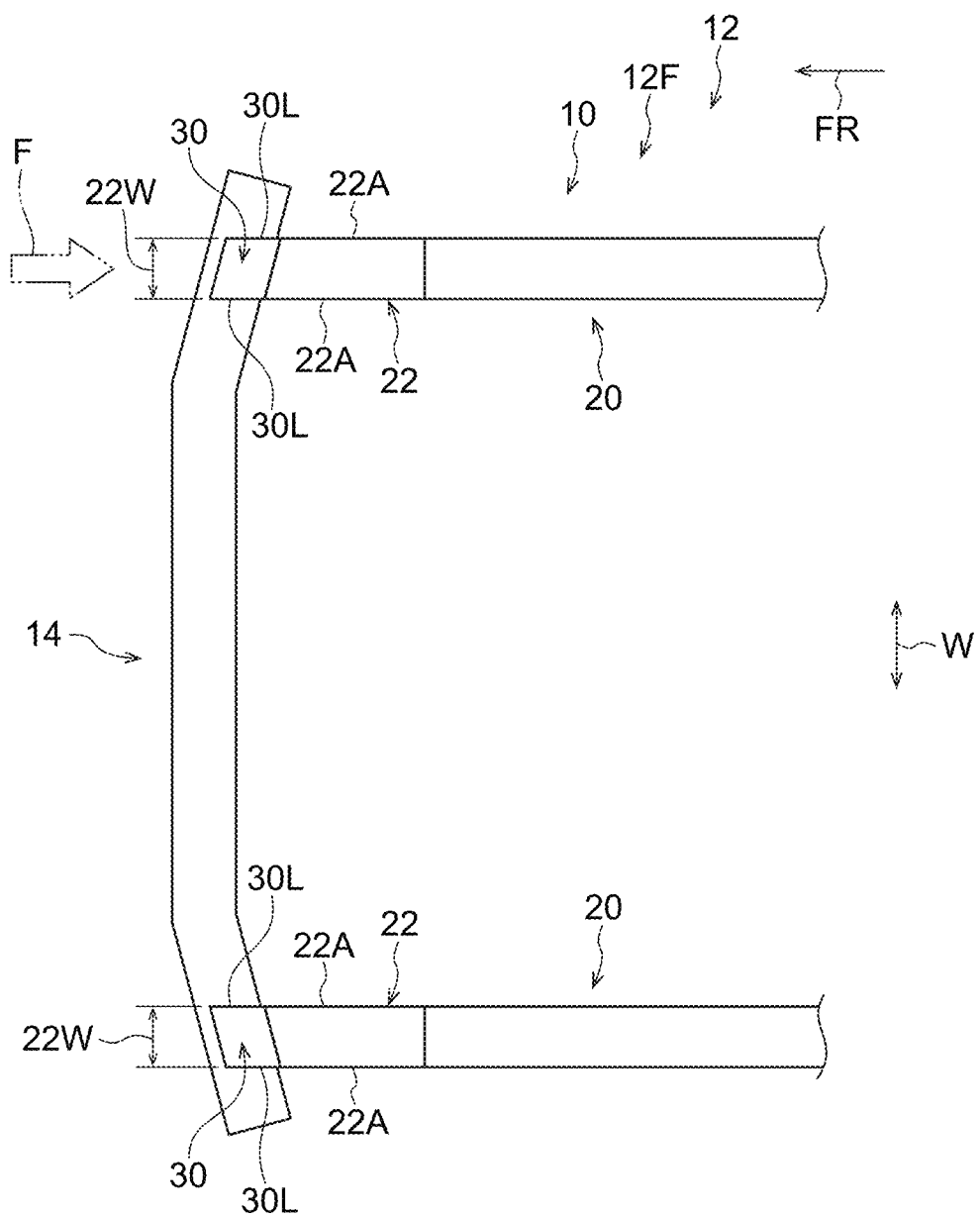
FIG. 2 is a simplified plan view showing the vehicle frame structure of FIG. 1.
Figure 3A:
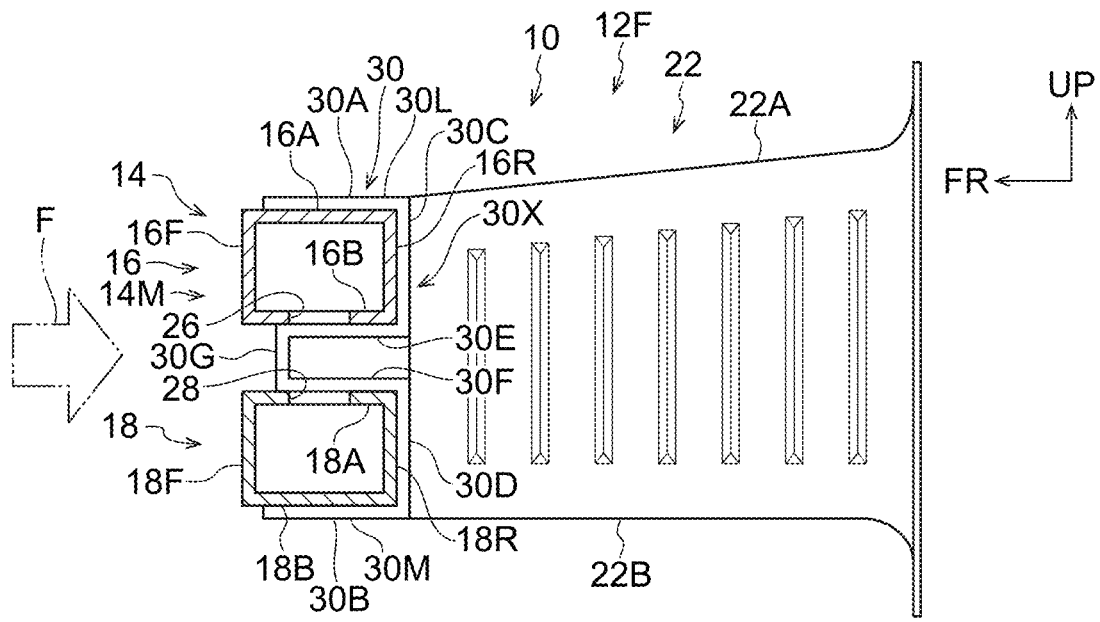
FIG. 3A is an enlarged longitudinal sectional view showing a state in which a front end portion side of a vehicle body front portion is cut in the vehicle front and rear direction along a vehicle width direction inner surface of a crash box located on the vehicle right front side of FIG. 2.
Figure 3B:
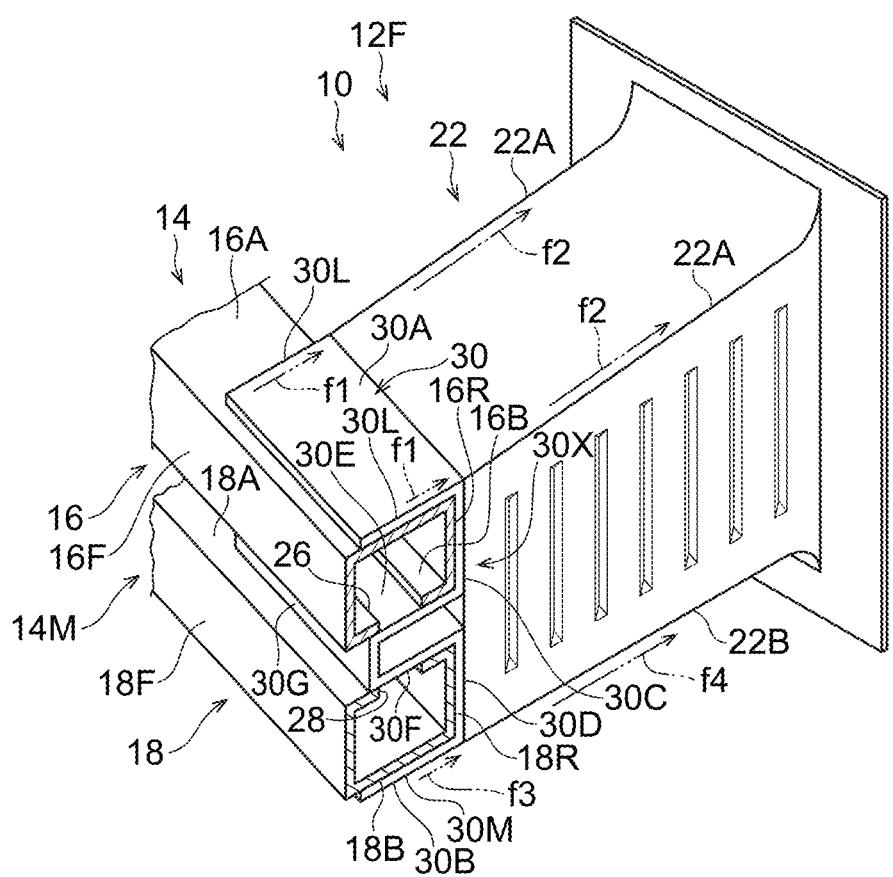
FIG. 3B is a simplified perspective view showing main portions of the vehicle frame structure of FIG. 2.

In FIG. 1 a vehicle frame structure 10 pertaining to the embodiment is shown in a simplified front view, and in FIG. 2 the vehicle frame structure 10 is shown in a simplified plan view. As shown in FIG. 1 and FIG. 2, a front bumper reinforcement 14 serving as a bumper reinforcement that extends along the vehicle width direction is disposed on the vehicle front and rear direction front end portion of a vehicle body front portion 12F. It will be noted that a radiator is disposed on the vehicle rear side of the front bumper reinforcement 14.

As shown in FIG. 2, a right and left pair of front side members 20 are disposed on both vehicle width direction sides of the vehicle body front portion 12F. The front side members 20 extend along the vehicle front and rear direction and are each configured to have a closed cross-sectional structure. Crash boxes 22 serving as shock absorbing components are intervened between the front bumper reinforcement 14 and the front side members 20. It will be noted that when the crash boxes 22 are viewed using the front bumper reinforcement 14 as a reference, the crash boxes 22 extend along the vehicle front and rear direction from the vehicle width direction end portion sides of the front bumper reinforcement 14 toward the vehicle front and rear direction central portion side of a vehicle body 12.

Each crash box 22 is configured to have a closed cross-sectional structure along the vehicle front and rear direction, and the rear end portions of the crash boxes 22 are secured to the front end portions of the front side members 20. In FIG. 3A is shown an enlarged longitudinal sectional view of a state in which the front end portion side of the vehicle body front portion 12F is cut in the vehicle front and rear direction along the vehicle width direction inner surface of the crash box 22 located on the vehicle right front side. In FIG. 3B main portions of the vehicle frame structure 10 are shown in a simplified perspective view. Each crash box 22 is formed in a substantially polygonal tube shape—as an example, a substantially hexagonal tube shape—but in FIG. 3A and FIG. 3B the crash box 22 is simplified and shown as having a quadrilateral tube shape. A known crash box can be applied to the crash boxes 22. Each crash box 22 has a right and left pair of upper ridgelines 22A that extend along the vehicle front and rear direction on the upper end portion side of the crash box 22 and a right and left pair of lower ridgelines 22B that extend along the vehicle front and rear direction on the lower end portion side of the crash box 22. The crash boxes 22 are configured to be compressively deformed in their axial direction by the input of a load equal to or greater than a predetermined value from the front bumper reinforcement 14.

As shown in FIG. 1, FIG. 3A, and FIG. 3B, the front bumper reinforcement 14 is equipped with an upper constituent member 16 that configures an upper portion of the front bumper reinforcement 14 and a lower constituent member 18 that configures a lower portion of the front bumper reinforcement 14. The upper constituent member 16 extends along the vehicle with direction and is disposed in such a way that the positions of its vehicle width direction end portion sides correspond to the upper portion sides of the crash boxes 22 (see FIG. 3A and FIG. 3B). Furthermore, the lower constituent member 18 extends along the vehicle width direction and is disposed in such a way that the positions of its vehicle width direction end portion sides correspond to the lower portion sides of the crash boxes 22 (see FIG. 3A and FIG. 3B).

As shown in FIG. 3A and FIG. 3B, the upper constituent member 16 has a rectangular tube shape overall and is formed in a hollow shape. That is, the upper constituent member 16 is equipped with an upper wall portion 16A that configures an upper surface of the upper constituent member 16, a lower wall portion 16B that configures a lower surface of the upper constituent member 16, a front wall portion 16F that interconnects the front end portion of the upper wall portion 16A and the front end portion of the lower wall portion 16B, and a rear wall portion 16R that interconnects the rear end portion of the upper wall portion 16A and the rear end portion of the lower wall portion 16B. The upper surface of the upper wall portion 16A and the lower surface of the lower wall portion 16B are disposed along the vehicle width direction and the vehicle front and rear direction. The upper constituent member 16 is secured to the upper portion sides of the front surfaces of the crash boxes 22 via retention brackets 30 whose details will be described later.

Cutout portions 26 serving as load transmission inhibitors are formed in the lower wall portion 16B of the upper constituent member 16. The cutout portions 26 in this embodiment are elements that can also be thought of as through holes. The cutout portions 26 are set in the lower wall portion 16B in such a way as to include vehicle width direction ranges 22W (see FIG. 2) corresponding to the crash boxes 22 (as an example, in such a way as to coincide with the ranges 22W) and are formed in the vehicle front and rear direction middle portion of the lower wall portion 16B in the ranges 22W (see FIG. 2).

The lower constituent member 18 has a rectangular tube shape overall, is formed in a hollow shape, and is disposed an interval apart from and on the vehicle lower side of the upper constituent member 16. That is, the lower constituent member 18 is equipped with an upper wall portion 18A that configures an upper surface of the lower constituent member 18, a lower wall portion 18B that configures a lower surface of the lower constituent member 18, a front wall portion 18F that interconnects the front end portion of the upper wall portion 8A and the front end portion of the lower wall portion 18B, and a rear wall portion 18R that interconnects the rear end portion of the upper wall portion 18A and the rear end portion of the lower wall portion 18B. The upper surface of the upper wall portion 18A and the lower surface of the lower wall portion 18B are disposed along the vehicle width direction and the vehicle front and rear direction. The lower constituent member 18 is secured to the lower portion sides of the front surfaces of the crash boxes 22 via the retention brackets 30 whose details will be described later.

Cutout portions 28 serving as load transmission inhibitors are formed in the upper wall portion 18A of the lower constituent member 18. The cutout portions 28 in this embodiment are elements that can also be thought of as through holes. The cutout portions 28 are set in the upper wall portion 18A in such a way as to include the vehicle width direction ranges 22W (see FIG. 2) corresponding to the crash boxes 22 (as an example, in such a way as to coincide with the ranges 22W) and are formed in the vehicle front and rear direction middle portion of the upper wall portion 18A in the ranges 22W (see FIG. 2).

Because of the above, the cutout portions 26 and 28 are provided in a middle constituent portion 14M that is a constituent portion of the front bumper reinforcement 14 and is positioned more in the vehicle downward direction than the upper wall portion 16A of the upper constituent member 16 and is positioned more in the vehicle upward direction than the lower wall portion 18B of the lower constituent member 18. Additionally, the cutout portions 26 and 28 function to inhibit load transmission from the middle constituent portion 14M to the crash boxes 22 in a case where a load F has been input to the front bumper reinforcement 14 from the opposite side of the crash boxes 22 side. That is, the cutout portions 26 and 28 are configured in such a way that at the time of a frontal impact to the vehicle the load transmission amount from the middle constituent portion 14M to the crash boxes 22 becomes smaller in comparison to the load transmission amounts from each of the upper wall portion 16A of the upper constituent member 16 and the lower wall portion 18B of the lower constituent member 18 to the crash boxes 22.

More specifically, the cutout portions 26 are formed in such a way that at the time of a frontal impact to the vehicle the load transmission amount from the lower wall portion 16B of the upper constituent member 16 to the crash boxes 22 becomes smaller in comparison to the load transmission amount from the upper wall portion 16A of the upper constituent member 16 to the crash boxes 22. Similarly, the cutout portions 28 are formed in such a way that at the time of a frontal impact to the vehicle the load transmission amount from the upper wall portion 18A of the lower constituent member 18 to the crash boxes 22 becomes smaller in comparison to the load transmission amount from the lower wall portion 18B of the lower constituent member 18 to the crash boxes 22.

The upper constituent member 16 and the lower constituent member 18 are coupled to each other by the retention brackets 30 at vehicle width direction positions corresponding to the crash boxes 22, and the retention brackets 30 are secured to the front surface sides of the crash boxes 22. Each retention bracket 30 is formed in the shape of a bent plate and is equipped with an upper wall portion 30A that is superposed on and joined to the upper surface side of the upper constituent member 16 and a lower wall portion 30B that is superposed on and joined to the lower surface side of the lower constituent member 18. Furthermore, each retention bracket 30 is equipped with an interconnecting wall portion 30X that interconnects the rear end portion (the end portion on the crash boxes 22 side) of the upper wall portion 30A and the rear end portion (the end portion on the crash boxes 22 side) of the lower wall portion 30B.

Formed on the upper half portion side of each interconnecting wall portion 30X are a first vertical wall portion 30C that is superposed on and joined to the rear surface side of the upper constituent member 16 and a first middle horizontal wall portion 30E that is superposed on and joined to the lower surface side of the upper constituent member 16. Formed on the lower half portion side of each interconnecting wall portion 30X are a second vertical wall portion 30D that is superposed on and joined to the rear surface side of the lower constituent member 18 and a second middle horizontal wall portion 30F that is superposed on and joined to the upper surface side of the lower constituent member 18. Also formed in each interconnecting wall portion 30X is a middle vertical wall portion 30G that interconnects the front end portion of the first middle horizontal wall portion 30E and the front end portion of the second middle horizontal wall portion 30F in the vehicle up and down direction.

The first vertical wall portion 30C is bent from the rear end portion of the upper wall portion 30A, extends in the vehicle downward direction, and is joined to the upper portion side of the front surface of the corresponding crash box 22. Furthermore, the second vertical wall portion 30D is bent from the rear end portion of the lower wall portion 30B, extends in the vehicle upward direction, and is joined to the lower portion side of the front surface of the corresponding crash box 22.

Furthermore, the first middle horizontal wall portion 30E is bent from the lower end portion of the first vertical wall portion 30C, extends in the vehicle forward direction, and blocks the corresponding cutout portion 26, and the front end portion of the first middle horizontal wall portion 30E is positioned a little more in the vehicle forward direction than the front edge portion of the cutout portion 26. The second middle horizontal wall portion 30F is bent from the upper end portion of the second vertical wall portion 30D, extends in the vehicle forward direction, and blocks the corresponding cutout portion 28, and the front end portion of the second middle horizontal wall portion 30F is positioned a little more in the vehicle forward direction than the front edge portion of the cutout portion 28. Moreover, the front end portion of the upper wall portion 30A and the front end portion of the lower wall portion 30B are positioned a little more in the vehicle forward direction than the front end portion of the first middle horizontal wall portion 30E and the front end portion of the second middle horizontal wall portion 30F.

As shown in FIG. 3B, upper ridgelines 30L formed on both sides of the upper surfaces of the upper wall portions 30A of the retention brackets 30 are disposed so as to be continuous with the right and left pairs of upper ridgelines 22A of the crash boxes 22. Furthermore, lower ridgelines 30M formed on both sides of the lower surfaces of the lower wall portions 30B of the retention brackets 30 are disposed so as to be continuous with the right and left pairs of lower ridgelines 22B of the crash boxes 22.

(Action and Effects of Embodiment)

Next, the action and effects of the embodiment will be described.

When an impact load F is input to a vehicle width direction end portion side of the front bumper reinforcement 14 shown in FIG. 2, the impact load F is transmitted to the crash box 22 and is further transmitted in the vehicle rearward direction along the front side members 20. Because of this, the crash boxes 22 become compressively deformed and energy absorption takes place. In addition, as shown in FIG. 1, in the front bumper reinforcement 14, the upper constituent member 16 and the lower constituent member 18 are disposed an interval apart from each other in the vehicle up and down direction, so air can pass between them. For this reason, it becomes possible to increase the volume of air traveling to the radiator disposed on the vehicle rear side of the front bumper reinforcement 14, and it becomes possible to improve the engine cooling performance.

Here, the cutout portions 26 and 28 are formed in the middle constituent portion 14M that is a constituent portion of the front bumper reinforcement 14 shown in FIG. 3A and FIG. 3B and is positioned more in the vehicle downward direction than the upper wall portion 16A of the upper constituent member 16 and is positioned more in the vehicle upward direction than the lower wall portion 18B of the lower constituent member 18. Additionally, the cutout portions 26 and 28 are formed in each of the lower wall portion 16B of the upper constituent member 16 and the upper wall portion 18A of the lower constituent member 18 in such a way as to include the vehicle width direction ranges 22W (see FIG. 2) corresponding to the crash boxes 22. Because the cutout portions 26 and 28 are formed, load transmission from the middle constituent portion 14M (more specifically, the lower wall portion 16B of the upper constituent member 16 and the upper wall portion 18A of the lower constituent member 18) to the crash boxes 22 in a case where the load F has been input to the front bumper reinforcement 14 from the opposite side of the crash boxes 22 side is inhibited. For this reason, the impact load F input to the front bumper reinforcement 14 at the time of an impact to the vehicle is well transmitted to the upper end sides and the lower end sides of the crash boxes 22 in comparison to the vehicle up and down direction middle portions of the crash boxes 22, so the crash boxes 22 become well compressively deformed.

Furthermore, in this embodiment the retention brackets 30 are intervened between the front bumper reinforcement 14 and the crash boxes 22. For this reason, when the impact load F is input to a vehicle width direction end portion side of the front bumper reinforcement 14, the impact load F is transmitted via the retention brackets 30 to the crash boxes 22.

Here, as shown in FIG. 3B, the upper ridgelines 30L formed on both sides of the upper surfaces of the upper wall portions 30A of the retention brackets 30 are disposed so as to be continuous with the right and left pairs of upper ridgelines 22A of the crash boxes 22. For this reason, impact loads that travel along the upper ridgelines 30L of the retention brackets 30 are directly transmitted to the upper ridgelines 22A of the crash boxes 22 (see arrows f1 and f2). Furthermore, the lower ridgelines 30M formed on both sides of the lower surfaces of the lower wall portions 30B of the retention brackets 30 are disposed so as to be continuous with the right and left pairs of lower ridgelines 22B of the crash boxes 22. For this reason, impact loads that travel along the lower ridgelines 30M of the retention brackets 30 are directly transmitted to the lower ridgelines 22B of the crash boxes 22 (see arrows f3 and f4). Because the impact loads are efficiently transmitted to the upper ridgelines 22A and the lower ridgelines 22B of the crash boxes 22 in this way, the crash boxes 22 become well compressively deformed.

As described above, the vehicle frame structure of the disclosure has the superior effect that it can well ensure a shock absorption amount at the time of an impact to the vehicle while allowing air to pass through the front bumper reinforcement 14.

Example Modifications

Next, example modifications of the embodiment will be described using FIG. 4A to FIG. 5B. FIG. 4A to FIG. 4D and FIG. 5A and FIG. 5B are longitudinal sectional views showing the example modifications in a state in which they are cut at the same cut position as FIG. 3A. It will be noted that the example modifications have substantially the same configurations as the embodiment except for the points described below. Constituent portions that are substantially the same as those of the embodiment are assigned the same reference signs, and description thereof will be omitted.

Furthermore, front bumper reinforcements 40, 50, 60, 70, 80, and 90 serving as bumper reinforcements in the example modifications below have substantially the same configuration as the front bumper reinforcement 14 of the embodiment (see FIG. 1 to FIG. 3B) except for the points described below.

Furthermore, in the descriptions of the example modifications below, middle constituent portions 40M, 50M, 60M, 70M, 80M, and 90M of the front bumper reinforcements 40, 50, 60, 70, 80, and 90 mean constituent portions of the front bumper reinforcements 40 to 90 that are positioned more in the vehicle downward direction than the upper wall portion 16A of upper constituent members 42, 52, 62, 72, 82, and 92 and are positioned more in the vehicle upward direction than the lower wall portion 18B of lower constituent members 44, 54, 64, 74, 84, and 94.

As shown in FIG. 4A, a first example modification differs from the embodiment in that recessed portions 46 and 48 serving as load transmission inhibitors are formed instead of the cutout portions 26 and 28 of the embodiment (see FIG. 3A and FIG. 3B). Other configurations are substantially the same as those of the embodiment.

In the upper constituent member 42 of the front bumper reinforcement 40 in this example modification, a lower wall portion 42B shown in FIG. 4A is formed instead of the lower wall portion 16B of the upper constituent member 16 of the embodiment (see FIG. 3A and FIG. 3B for both). The recessed portion 46 is formed in the lower wall portion 42B. The recessed portion 46 is a portion that is recessed in the shape of a rectangular box in the vehicle upward direction. In the lower constituent member 44, an upper wall portion 44A shown in FIG. 4A is formed instead of the upper wall portion 18A of the lower constituent member 18 of the embodiment (see FIG. 3A and FIG. 3B for both). The recessed portion 48 is formed in the upper wall portion 44A. The recessed portion 48 is a portion that is recessed in the shape of a rectangular box in the vehicle downward direction. The recessed portions 46 and 48 are set in each of the lower wall portion 42B of the upper constituent member 42 and the upper wall portion 44A of the lower constituent member 44 in such a way as to include the vehicle width direction ranges 22W (see FIG. 2) corresponding to the crash boxes 22 (as an example, across the entire longitudinal direction length of each of the lower wall portion 42B and the upper wall portion 44A) and are formed in the vehicle front and rear direction middle portions of the lower wall portion 42B and the upper wall portion 44A in the ranges 22W (see FIG. 2).

Because of the above, the recessed portions 46 and 48 are provided in the middle constituent portion 40M of the front bumper reinforcement 40. Additionally, the recessed portions 46 and 48 function to inhibit load transmission from the middle constituent portion 40M to the crash boxes 22 in a case where a load has been input to the front bumper reinforcement 40 from the opposite side of the crash boxes 22 side.

It will be noted that the open portion of the recessed portion 46 of the upper constituent member 42 is blocked by the first middle horizontal wall portions 30E of the retention brackets 30. Furthermore, the open portion of the recessed portion 48 of the lower constituent member 44 is blocked by the second middle horizontal wall portions 30F of the retention brackets 30.

As shown in FIG. 4B, a second example modification differs from the embodiment in that wavelike portions 56 and 58 serving as load transmission inhibitors are formed instead of the cutout portions 26 and 28 of the embodiment (see FIG. 3A and FIG. 3B). Other configurations are substantially the same as those of the embodiment.

In the upper constituent member 52 of the front bumper reinforcement 50 in this example modification, a lower wall portion 52B shown in FIG. 4B is formed instead of the lower wall portion 16B of the upper constituent member 16 of the embodiment (see FIG. 3A and FIG. 3B for both). The wavelike portion 56 is formed in the lower wall portion 52B. The wavelike portion 56 has the shape of a corrugated plate as seen in a longitudinal sectional view and is formed by two portions curvedly recessed in the vehicle upward direction being provided side by side in the vehicle front and rear direction. In the lower constituent member 54, an upper wall portion 54A shown in FIG. 4B is formed instead of the upper wall portion 18A of the lower constituent member 18 of the embodiment (see FIG. 3A and FIG. 3B for both). The wavelike portion 58 is formed in the upper wall portion 54A. The wavelike portion 58 has the shape of a corrugated plate as seen in a longitudinal sectional view and is formed by two portions curvedly recessed in the vehicle downward direction being provided side by side in the vehicle front and rear direction. The wavelike portions 56 and 58 are set in each of the lower wall portion 52B of the upper constituent member 52 and the upper wall portion 54A of the lower constituent member 54 in such a way as to include the vehicle width direction ranges 22W (see FIG. 2) corresponding to the crash boxes 22 (as an example, across the entire longitudinal direction length of each of the lower wall portion 52B and the upper wall portion 54A) and are formed in the vehicle front and rear direction middle portions of the lower wall portion 52B and the upper wall portion 54 in the ranges 22W (see FIG. 2).

Because of the above, the wavelike portions 56 and 58 are provided in the middle constituent portion 50M of the front bumper reinforcement 50. Additionally, the wavelike portions 56 and 58 function to inhibit load transmission from the middle constituent portion 50M to the crash boxes 22 in a case where a load has been input to the front bumper reinforcement 50 from the opposite side of the crash boxes 22 side.

It will be noted that the two downward-facing open portions of the wavelike portion 56 of the upper constituent member 52 are blocked by the first middle horizontal wall portions 30E of the retention brackets 30. Furthermore, the two upward-facing open portions of the wavelike portion 58 of the lower constituent member 54 are blocked by the second middle horizontal wall portions 30F of the retention brackets 30.

As shown in FIG. 4C, a third example modification differs from the embodiment in that thin-walled portions 66 and 68 serving as load transmission inhibitors are formed instead of the cutout portions 26 and 28 of the embodiment (see FIG. 3A and FIG. 3B). Other configurations are substantially the same as those of the embodiment.

In the upper constituent member 62 of the front bumper reinforcement 60 in this example modification, a lower wall portion 62B shown in FIG. 4C is formed instead of the lower wall portion 16B of the upper constituent member 16 of the embodiment (see FIG. 3A and FIG. 3B for both). The thin-walled portion 66 is formed in the lower wall portion 62B. The thin-walled portion 66 is a portion whose wall thickness is thinner in comparison to the other portions of the upper constituent member 62. In the lower constituent member 64, an upper wall portion 64A shown in FIG. 4C is formed instead of the upper wall portion 18A of the lower constituent member 18 of the embodiment (see FIG. 3A and FIG. 3B for both). The thin-walled portion 68 is formed in the upper wall portion 64A. The thin-walled portion 68 is a portion whose wall thickness is thinner in comparison to the other portions of the lower constituent member 64. The thin-walled portions 66 and 68 are set in each of the lower wall portion 62B of the upper constituent member 62 and the upper wall portion 64A of the lower constituent member 64 in such a way as to include the vehicle width direction ranges 22W (see FIG. 2) corresponding to the crash boxes 22 (as an example, across the entire longitudinal direction length of each of the lower wall portion 62B and the upper wall portion 64A) and are formed in the entire vehicle front and rear direction regions of the lower wall portion 62B and the upper wall portion 64A in the ranges 22W (see FIG. 2).

Because of the above, the thin-walled portions 66 and 68 are provided in the middle constituent portion 60M of the front bumper reinforcement 60. Additionally, the thin-walled portions 66 and 68 function to inhibit load transmission from the middle constituent portion 60M to the crash boxes 22 in a case where a load has been input to the front bumper reinforcement 60 from the opposite side of the crash boxes 22 side.

As shown in FIG. 4D, a fourth example modification differs from the embodiment in that projecting portions 76 and 78 serving as load transmission inhibitors are formed instead of the cutout portions 26 and 28 of the embodiment (see FIG. 3A and FIG. 3B).

In the upper constituent member 72 of the front bumper reinforcement 70 in this example modification, a lower wall portion 72B shown in FIG. 4D is formed instead of the lower wall portion 16B of the upper constituent member 16 of the embodiment (see FIG. 3A and FIG. 3B for both). The projecting portion 76 is formed in the lower wall portion 72B. The projecting portion 76 is a portion that projects in the shape of a V in the vehicle downward direction from the front and rear end portions of the lower wall portion 72B as seen in a vehicle side view. In the lower constituent member 74, an upper wall portion 74A shown in FIG. 4D is formed instead of the upper wall portion 18A of the lower constituent member 18 of the embodiment (see FIG. 3A and FIG. 3B for both). The projecting portion 78 is formed in the upper wall portion 74A. The projecting portion 78 is a portion that projects in the shape of a V in the vehicle upward direction from the front and rear end portions of the upper wall portion 74A as seen in a vehicle side view. The projecting portions 76 and 78 are formed in each of the lower wall portion 72B of the upper constituent member 72 and the upper wall portion 74A of the lower constituent member 74 in such a way as to include the vehicle width direction ranges 22W (see FIG. 2) corresponding to the crash boxes 22 (as an example, across the entire longitudinal direction length of each of the lower wall portion 72B and the upper wall portion 74A).

Because of the above, the projecting portions 76 and 78 are provided in the middle constituent portion 70M of the front bumper reinforcement 70. Additionally, the projecting portions 76 and 78 function to inhibit load transmission from the middle constituent portion 70M to the crash boxes 22 in a case where a load has been input to the front bumper reinforcement 70 from the opposite side of the crash boxes 22 side.

Retention brackets 130 in this example modification are equipped with first middle inclined wall portions 130E instead of the first middle horizontal wall portions 30E of the retention brackets 30 of the embodiment (see FIG. 3A and FIG. 3B for both) and are equipped with second middle inclined wall portions 130F instead of the second middle horizontal wall portions 30F (see FIG. 3A and FIG. 3B). The first middle inclined wall portions 130E are superposed on and joined to the lower surface side of the vehicle rear half of the projecting portion 76, and the second middle inclined wall portions 130F are superposed on and joined to the upper surface side of the vehicle rear half of the projecting portion 78. It will be noted that interconnecting wall portions 130X of this example modification are configured by the first vertical wall portions 30C, the first middle inclined wall portions 130E, the middle vertical wall portions 30G the second middle inclined wall portions 130F, and the second vertical wall portions 30D.

According to the first example modification to the fourth example modification described above, generally the same action and effects as those of the embodiment are obtained. Furthermore, according to the first example modification to the fourth example modification, water can basically be prevented from entering the insides of the tubular shapes of the upper constituent members 42, 52, 62, and 72 and the lower constituent members 44, 54, 64, and 74 from their outer peripheral sides.

Figure 5A:
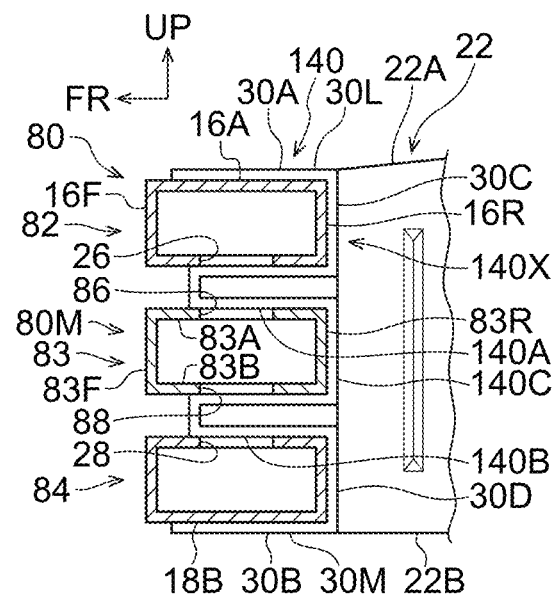
FIG. 5A is a longitudinal sectional view showing a fifth example modification.

As shown in FIG. 5A, the upper constituent member 82 in a fifth example modification has substantially the same shape as the upper constituent member 16 of the embodiment (see FIG. 3A and FIG. 3B) but is smaller, and the position of its lower surface is set a little higher, in the vehicle up and down direction than the upper constituent member 16 of the embodiment (see FIG. 3A and FIG. 3B). Furthermore, the lower constituent member 84 has substantially the same shape as the lower constituent member 18 of the embodiment (see FIG. 3A and FIG. 3B) but is smaller, and the position of its upper surface is set a little lower, in the vehicle up and down direction than the lower constituent member 18 of the embodiment (see FIG. 3A and FIG. 3B). It will be noted that for the sake of convenience the constituent portions of the upper constituent member 82 are assigned the same reference signs as the constituent portions of the upper constituent member 16 of the embodiment (see FIG. 3A and FIG. 3B) and the constituent portions of the lower constituent member 84 are assigned the same reference signs as the constituent portions of the lower constituent member 18 of the embodiment (see FIG. 3A and FIG. 3B).

The front bumper reinforcement 80 in the fifth example modification is equipped with a central constituent member 83 in addition to the upper constituent member 82 and the lower constituent member 84. The central constituent member 83 configures an up and down direction central portion of the front bumper reinforcement 80, extends along the vehicle width direction, is disposed an interval away from and on the vehicle lower side of the upper constituent member 82, and is disposed an interval away from and on the vehicle upper side of the lower constituent member 84.

The central constituent member 83 is a hollow member having the shape of a rectangular tube overall and extends along the vehicle width direction. That is, the central constituent member 83 is equipped with an upper wall portion 83A that configures an upper surface of the central constituent member 83, a lower wall portion 83B that configures a lower surface of the central constituent member 83, a front wall portion 83F that interconnects the front end portion of the upper wall portion 83A and the front end portion of the lower wall portion 83B, and a rear wall portion 83R that interconnects the rear end portion of the upper wall portion 83A and the rear end portion of the lower wall portion 83B. The upper surface of the upper wall portion 83A and the lower surface of the lower wall portion 83B are disposed along the vehicle width direction and the vehicle front and rear direction. The central constituent member 83 is secured via retention brackets 140 to the vehicle up and down direction central portion sides of the front surfaces of the crash boxes 22.

Cutout portions 86 serving as load transmission inhibitors are formed in the upper wall portion 83A of the central constituent member 83, and cutout portions 88 serving as load transmission inhibitors are formed in the lower wall portion 83B of the central constituent member 83. The cutout portions 86 and 88 are set in each of the upper wall portion 83A and the lower wall portion 83B of the central constituent member 83 in such a way as to include the vehicle width direction ranges 22W (see FIG. 2) corresponding to the crash boxes 22 (as an example, so as to coincide with the ranges 22W) and are formed in the vehicle front and rear direction middle portions of the upper wall portion 83A and the lower wall portion 83B in the ranges 22W (see FIG. 2).

Because of the above, the cutout portions 26, 28, 86, and 88 are provided in the middle constituent portion 80M of the front bumper reinforcement 80. Additionally, the cutout portions 26, 28, 86, and 88 function to inhibit load transmission from the middle constituent portion 80M to the crash boxes 22 in a case where a load has been input to the front bumper reinforcement 80 from the opposite side of the crash boxes 22 side.

The retention brackets 140 are equipped with interconnecting wall portions 140X instead of the interconnecting wall portions 30X of the retention brackets 30 of the embodiment (see FIG. 3A and FIG. 3B for both). Each interconnecting wall portion 140X is equipped with a first middle intervening portion 140A, which is intervened between the upper constituent member 82 and the central constituent member 83 and is shaped substantially like a U whose vehicle rear side is open as seen in a vehicle side view, and a second middle intervening portion 140B, which is intervened between the central constituent member 83 and the lower constituent member 84 and is shaped substantially like a U whose vehicle rear side is open as seen in a vehicle side view. The lower end portion on the vehicle rear side of the first middle intervening portion 140A and the upper end portion on the vehicle rear side of the second middle intervening portion 140B are interconnected by a rear middle vertical wall portion 140C.

The first middle intervening portions 140A are joined to the lower surface of the upper constituent member 82 and the upper surface of the central constituent member 83 and block the cutout portions 26 of the upper constituent member 82 and the cutout portions 86 of the central constituent member 83. The second middle intervening portions 140B are joined to the lower surface of the central constituent member 83 and the upper surface of the lower constituent member 84 and block the cutout portions 88 of the central constituent member 83 and the cutout portions 28 of the lower constituent member 84. Furthermore, the rear middle vertical wall portions 140C are joined to the rear surface of the central constituent member 83 and the vehicle up and down direction central portions of the front surface sides of the crash boxes 22.

According to this fifth example modification also, generally the same action and effects as those of the embodiment are obtained.

Figure 5B:
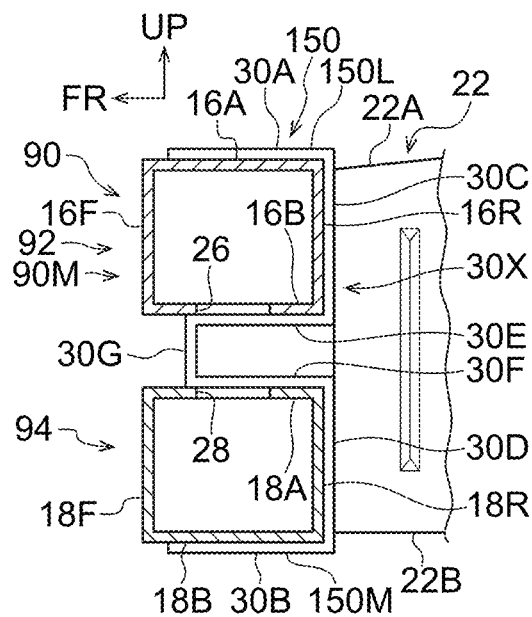
FIG. 5B is a longitudinal sectional view showing a sixth example modification.

As shown in FIG. 5B, the upper constituent member 92 of the front bumper reinforcement 90 in a sixth example modification has generally the same shape as the upper constituent member 16 of the embodiment (see FIG. 3A and FIG. 3B) but is larger, and the position of its upper surface is set a little higher, than the upper constituent member 16 of the embodiment (see FIG. 3A and FIG. 3B). Furthermore, the lower constituent member 94 of the front bumper reinforcement 90 has generally the same shape as the lower constituent member 18 of the embodiment (see FIG. 3A and FIG. 3B) but is larger, and the position of its lower surface is set a little lower, than the lower constituent member 18 of the embodiment (see FIG. 3A and FIG. 3B). Because of the above, the middle constituent portion 90M of the front bumper reinforcement 90 has substantially the same configuration as the middle constituent portion 14M of the front bumper reinforcement 14 of the embodiment (see FIG. 3A and FIG. 3B for both). It will be noted that for the sake of convenience the constituent portions of the upper constituent member 92 are assigned the same reference signs as the constituent portions of the upper constituent member 16 of the embodiment (see FIG. 3A and FIG. 3B) and the constituent portions of the lower constituent member 94 are assigned the same reference signs as the constituent portions of the lower constituent member 18 of the embodiment (see FIG. 3A and FIG. 3B).

Furthermore, retention brackets 150 in this example modification have generally the same shape as the retention brackets 30 of the embodiment (see FIG. 3A and FIG. 3B) but are larger, and the position of their upper surfaces is set a little higher and the position of their lower surfaces is set a little lower, than the retention brackets 30 of the embodiment (see FIG. 3A and FIG. 3B). Upper ridgelines 150L formed on both sides of the upper surfaces of the retention brackets 150 are disposed in a higher position with respect to the front end sides of the right and left pairs of upper ridgelines 22A of the crash boxes 22. Furthermore, lower ridgelines 150M formed on both sides of the lower surfaces of the retention brackets 150 are disposed in a lower position with respect to the front end sides of the right and left pairs of lower ridgelines 22B of the crash boxes 22. It will be noted that for the sake of convenience the constituent portions of the retention brackets 150 are assigned the same reference signs as the constituent portions of the retention brackets 30 of the embodiment except for the upper ridgelines 150L and the lower ridgelines 150M.

This sixth example modification is inferior to the embodiment in terms of load transmissibility from the upper ridgelines 150L of the retention brackets 150 to the upper ridgelines 22A of the crash boxes 22 and load transmissibility from the lower ridgelines 150M of the retention brackets 150 to the lower ridgelines 22B of the crash boxes 22, but according to this sixth example modification also, the crash boxes 22 can be well compressively deformed at the time of a frontal impact to the vehicle.

(Supplemental Description of Embodiment)

In the embodiment and the example modifications thereof, the vehicle frame structure pertaining to the disclosure is applied to the vehicle body front portion 12F shown in FIG. 1 to FIG. 5B, but the vehicle frame structure pertaining to the disclosure is not limited to this and may also be applied to a vehicle body rear portion. In this case, it suffices to longitudinally reverse, in a vehicle frame structure having a rear bumper reinforcement and crash boxes (shock absorbing components), the configurations of the embodiment.

Furthermore, in the embodiment, the rear end portions of the crash boxes 22 are secured to the front end portions of the front side members 20, but, for example, a configuration can also be employed where shock absorbing components that become compressively deformed by the input of a load equal to or greater than a predetermined value from the bumper reinforcement are provided as part of the side members on the end portion sides of the side members on the bumper reinforcement side.

It will be noted that the embodiment and the plural example modifications can be appropriately combined with each other and implemented.

An example of the disclosure has been described above, but the disclosure is not limited to what is described above and can be modified and implemented in a variety of ways, in addition to what is described above, in a range that does not depart from the spirit thereof.

An object of the present disclosure is to obtain a vehicle frame structure that can well ensure a shock absorption amount at the time of an impact to the vehicle while allowing air to pass through a bumper reinforcement.

A first aspect of the present disclosure is a vehicle frame structure that includes: a bumper reinforcement that is disposed at a vehicle front and rear direction end portion of a vehicle body and that extends along a vehicle width direction; and shock absorbing components that extend along a vehicle front and rear direction from vehicle width direction end portion sides of the bumper reinforcement toward a vehicle front and rear direction central portion side of the vehicle body, that are configured to have a closed cross-sectional structure, and that become compressively deformed by input of a load equal to or greater than a predetermined value from the bumper reinforcement, wherein the bumper reinforcement includes: an upper constituent member that extends along the vehicle width direction, that is disposed in such a way that positions of its vehicle width direction end portion sides correspond to upper portion sides of the shock absorbing components, and that is formed in a hollow shape, a lower constituent member that extends along the vehicle width direction, that is disposed in such a way that positions of its vehicle width direction end portion sides correspond to lower portion sides of the shock absorbing components, that is disposed at an interval apart from, and on a vehicle lower side of, the upper constituent member, and that is formed in a hollow shape, and a middle constituent portion that is positioned further toward the vehicle lower side than an upper wall portion configuring an upper surface of the upper constituent member, that is positioned further toward the vehicle lower side than a lower wall portion configuring a lower surface of the lower constituent member, and that is provided with load transmission inhibitors that inhibit load transmission from the middle constituent portion to the shock absorbing components in a case in which a load has been input to the bumper reinforcement from an opposite side from a shock absorbing components side.

According to this configuration, when an impact load is input to a vehicle width direction end portion side of the bumper reinforcement, the impact load is transmitted to the shock absorbing components. Because of this, the shock absorbing components become compressively deformed and energy absorption takes place. In addition, in the bumper reinforcement, the upper constituent member and the lower constituent member are disposed an interval apart from each other in the vehicle up and down direction, so air can pass between them.

Here, the load transmission inhibitors are provided in the middle constituent portion that is a constituent portion of the bumper reinforcement and is positioned more in the vehicle downward direction than the upper wall portion configuring the upper surface of the upper constituent member and is positioned more in the vehicle upward direction than the lower wall portion configuring the lower surface of the lower constituent member. The load transmission inhibitors inhibit load transmission from the middle constituent portion to the shock absorbing components in a case where a load has been input to the bumper reinforcement from the opposite side of the shock absorbing components side. For this reason, the impact load input to the bumper reinforcement at the time of an impact to the vehicle is well transmitted to the upper end sides and the lower end sides of the shock absorbing components in comparison to the vehicle up and down direction middle portions of the shock absorbing components, so the shock absorbing components become well compressively deformed.

A second aspect of the present disclosure is the vehicle frame structure according to the first aspect, wherein, as the load transmission inhibitors, cutout portions set in such a way as to include vehicle width direction ranges corresponding to the shock absorbing components are formed in each of a lower wall portion configuring a lower surface of the upper constituent member and an upper wall portion configuring an upper surface of the lower constituent member.

According to this configuration, the cutout portions are formed in the lower wall portion of the upper constituent member and the upper wall portion of the lower constituent member, so at the time of an impact to the vehicle the impact loads transmitted from each of the lower wall portion of the upper constituent member and the upper wall portion of the lower constituent member to the vehicle up and down direction middle portions of the shock absorbing components are effectively inhibited. Additionally, by corresponding amounts the impact loads are transmitted to the upper end sides and the lower end sides of the shock absorbing components, so the shock absorbing components become well compressively deformed.

A third aspect of the present disclosure is the vehicle frame structure according to the first or the second aspect, wherein: the shock absorbing components each include: a right and left pair of upper ridgelines that extend along the vehicle front and rear direction on an upper end portion side of the shock absorbing component, and a right and left pair of lower ridgelines that extend along the vehicle front and rear direction on a lower end portion side of the shock absorbing component; retention brackets that intercouple the upper constituent member and the lower constituent member and that are secured to the shock absorbing components are provided at vehicle width direction positions corresponding to the shock absorbing components; the retention brackets each include: an upper wall portion that is superposed on an upper surface side of the upper constituent member, a lower wall portion that is superposed on a lower surface side of the lower constituent member, and an interconnecting wall portion that interconnects an end portion of the upper wall portion on the shock absorbing components side and an end portion of the lower wall portion on the shock absorbing components side; upper ridgelines formed on both sides of upper surfaces of the upper wall portions of the retention brackets are disposed so as to be continuous with the right and left pairs of upper ridgelines of the shock absorbing components; and lower ridgelines formed on both sides of lower surfaces of the lower wall portions of the retention brackets are disposed so as to be continuous with the right and left pairs of lower ridgelines of the shock absorbing components.

According to this configuration, when an impact load is input to a vehicle width direction end portion side of the bumper reinforcement, the impact load is transmitted via the retention brackets to the shock absorbing components. Here, the upper ridgelines formed on both sides of the upper surfaces of the upper wall portions of the retention brackets are disposed so as to be continuous with the right and left pairs of upper ridgelines of the shock absorbing components. For this reason, impact loads that travel along the upper ridgelines of the retention brackets are directly transmitted to the upper ridgelines of the shock absorbing components. Furthermore, the lower ridgelines formed on both sides of the lower surfaces of the lower wall portions of the retention brackets are disposed so as to be continuous with the right and left pairs of lower ridgelines of the shock absorbing components. For this reason, impact loads that travel along the lower ridgelines of the retention brackets are directly transmitted to the lower ridgelines of the shock absorbing components. Because the impact loads are efficiently transmitted to the upper ridgelines and the lower ridgelines of the shock absorbing components in this way, the shock absorbing components become well compressively deformed.

As described above, the vehicle frame structure of the disclosure can well ensure a shock absorption amount at the time of an impact to the vehicle while allowing air to pass through the bumper reinforcement.

What is claimed is:
1. A vehicle frame structure comprising:
   a bumper reinforcement that is disposed at a vehicle front and rear direction end portion of a vehicle body and that extends along a vehicle width direction; and
   shock absorbing components that extend along a vehicle front and rear direction from vehicle width direction end portion sides of the bumper reinforcement toward a vehicle front and rear direction central portion side of the vehicle body, that are configured to have a closed cross-sectional structure, and that become compressively deformed by input of a load equal to or greater than a predetermined value from the bumper reinforcement,
   wherein
   the bumper reinforcement includes:
      an upper constituent member that extends along the vehicle width direction, that is disposed in such a way that positions of its vehicle width direction end portion sides correspond to upper portion sides of the shock absorbing components, and that is formed in a hollow shape,
      a lower constituent member that extends along the vehicle width direction, that is disposed in such a way that positions of its vehicle width direction end portion sides correspond to lower portion sides of the shock absorbing components, that is disposed at an interval apart from, and on a vehicle lower side of, the upper constituent member, and that is formed in a hollow shape, and
      a middle constituent portion that is provided with load transmission inhibitors configured to inhibit load transmission from the middle constituent portion to the shock absorbing components in response to a load input to the bumper reinforcement from an opposite side from a shock absorbing components side, and
   the load transmission inhibitors are formed in
      a lower wall portion configuring a lower surface of the upper constituent member, and
      an upper wall portion configuring an upper surface of the lower constituent member.
2. The vehicle frame structure according to claim 1, wherein
   the load transmission inhibitors comprise cutout portions formed in the lower wall portion configuring the lower surface of the upper constituent member and the upper wall portion configuring the upper surface of the lower constituent member, and
   in the vehicle width direction, the cutout portions extend over ranges corresponding to the shock absorbing components.
3. The vehicle frame structure according to claim 1, wherein
   the load transmission inhibitors comprise recessed portions formed in the lower surface of the upper constituent member and the upper surface of the lower constituent member, and
   in the vehicle width direction, the recessed portions extend over ranges corresponding to the shock absorbing components.
4. The vehicle frame structure according to claim 1, wherein
   the load transmission inhibitors comprise wave-shaped portions formed in the lower surface of the upper constituent member and the upper surface of the lower constituent member, and in the vehicle width direction, the wave-shaped portions extend over ranges corresponding to the shock absorbing components.

5. The vehicle frame structure according to claim 1, wherein the load transmission inhibitors comprise thin-walled portions formed in the lower surface of the upper constituent member and the upper surface of the lower constituent member, and in the vehicle width direction, the thin-walled portions extend over ranges corresponding to the shock absorbing components.

6. The vehicle frame structure according to claim 1, wherein:

the shock absorbing components each include:
a right and left pair of upper ridgelines that extend along the vehicle front and rear direction on an upper end portion side of the shock absorbing component, and
a right and left pair of lower ridgelines that extend along the vehicle front and rear direction on a lower end portion side of the shock absorbing component, retention brackets that intercouple the upper constituent member and the lower constituent member and that are secured to the shock absorbing components are provided at vehicle width direction positions corresponding to the shock absorbing components, the retention brackets each include:
an upper wall portion that is superposed on an upper surface side of the upper constituent member,
a lower wall portion that is superposed on a lower surface side of the lower constituent member, and
an interconnecting wall portion that interconnects an end portion of the upper wall portion on the shock absorbing components side and an end portion of the lower wall portion on the shock absorbing components side, upper ridgelines formed on both sides of upper surfaces of the upper wall portions of the retention brackets are disposed so as to be continuous with the right and left pairs of upper ridgelines of the shock absorbing components, and lower ridgelines formed on both sides of lower surfaces of the lower wall portions of the retention brackets are disposed so as to be continuous with the right and left pairs of lower ridgelines of the shock absorbing components.

7. The vehicle frame structure according to claim 1, wherein the upper constituent member is spaced, in a vehicle up and down direction, from the lower constituent member by an air gap to permit air to pass between the upper constituent member and the lower constituent member.

8. The vehicle frame structure according to claim 1, wherein the load transmission inhibitors comprise
an upper projecting portion projecting downwardly in a vehicle up and down direction from front and rear end portions of the lower wall portion, and
a lower projecting portion projecting upwardly in the vehicle up and down direction from front and rear end portions of the upper wall portion, each of the upper projecting portion and the lower projecting portion has front and rear wall portions slanted with respect to both the vehicle up and down direction and the vehicle front and rear direction, and in the vehicle width direction, the upper projecting portion and the lower projecting portion extend over ranges corresponding to the shock absorbing components.

9. The vehicle frame structure according to claim 1, wherein the load transmission inhibitors comprise
an upper cutout portion formed in the lower wall portion configuring the lower surface of the upper constituent member,
a lower cutout portion formed in the upper wall portion configuring the upper surface of the lower constituent member, and
first and second middle cutout portions correspondingly formed in upper and lower wall portions of the middle constituent portion which has a hollow structure, and in the vehicle width direction, the upper cutout portion, the lower cutout portion and the first and second middle cutout portions extend over ranges corresponding to the shock absorbing components.

10. The vehicle frame structure according to claim 1, wherein the shock absorbing components each include:
a right and left pair of upper ridgelines that extend along the vehicle front and rear direction on an upper end portion side of the shock absorbing component, and
a right and left pair of lower ridgelines that extend along the vehicle front and rear direction on a lower end portion side of the shock absorbing component, retention brackets that intercouple the upper constituent member and the lower constituent member and that are secured to the shock absorbing components are provided at vehicle width direction positions corresponding to the shock absorbing components, the retention brackets each include:
an upper wall portion that is superposed on an upper surface side of the upper constituent member,
a lower wall portion that is superposed on a lower surface side of the lower constituent member, and
an interconnecting wall portion that interconnects an end portion of the upper wall portion on the shock absorbing components side and an end portion of the lower wall portion on the shock absorbing components side, upper ridgelines formed on both sides of upper surfaces of the upper wall portions of the retention brackets are disposed, in a vehicle up and down direction, higher than the right and left pairs of upper ridgelines of the shock absorbing components, and lower ridgelines formed on both sides of lower surfaces of the lower wall portions of the retention brackets are disposed, in the vehicle up and down direction, lower than the right and left pairs of lower ridgelines of the shock absorbing components.

11. A vehicle frame structure, comprising:
a bumper reinforcement that is disposed at a vehicle front and rear direction end portion of a vehicle body and that extends along a vehicle width direction; and
shock absorbing components that extend along a vehicle front and rear direction from vehicle width direction end portion sides of the bumper reinforcement toward a vehicle front and rear direction central portion side of the vehicle body, that are configured to have a closed cross-sectional structure, and that become compressively deformed by input of a load equal to or greater than a predetermined value from the bumper reinforcement, wherein the bumper reinforcement includes:

an upper constituent member that extends along the vehicle width direction, that is disposed in such a way that positions of its vehicle width direction end portion sides correspond to upper portion sides of the shock absorbing components, and that is formed in a hollow shape, a lower constituent member that extends along the vehicle width direction, that is disposed in such a way that positions of its vehicle width direction end portion sides correspond to lower portion sides of the shock absorbing components, that is disposed at an interval apart from, and on a vehicle lower side of, the upper constituent member, and that is formed in a hollow shape, and a middle constituent portion that is positioned further toward the vehicle lower side than an upper wall portion configuring an upper surface of the upper constituent member, that is positioned further toward the vehicle lower side than a lower wall portion configuring a lower surface of the lower constituent member, and that is provided with load transmission inhibitors that inhibit load transmission from the middle constituent portion to the shock absorbing components in a case in which a load has been input to the bumper reinforcement from an opposite side from a shock absorbing components side, the shock absorbing components each include:

a right and left pair of upper ridgelines that extend along the vehicle front and rear direction on an upper end portion side of the shock absorbing component, and a right and left pair of lower ridgelines that extend along the vehicle front and rear direction on a lower end portion side of the shock absorbing component, retention brackets that intercouple the upper constituent member and the lower constituent member and that are secured to the shock absorbing components are provided at vehicle width direction positions corresponding to the shock absorbing components, the retention brackets each include:

an upper wall portion that is superposed on an upper surface side of the upper constituent member, a lower wall portion that is superposed on a lower surface side of the lower constituent member, and an interconnecting wall portion that interconnects an end portion of the upper wall portion on the shock absorbing components side and an end portion of the lower wall portion on the shock absorbing components side, upper ridgelines formed on both sides of upper surfaces of the upper wall portions of the retention brackets are disposed so as to be continuous with the right and left pairs of upper ridgelines of the shock absorbing components, and lower ridgelines formed on both sides of lower surfaces of the lower wall portions of the retention brackets are disposed so as to be continuous with the right and left pairs of lower ridgelines of the shock absorbing components.

* * * * *